United States Patent
Jain et al.

(10) Patent No.: US 12,503,420 B2
(45) Date of Patent: Dec. 23, 2025

(54) PROCESS FOR PHOTOCATALYTIC HYDROCARBOXYLATION OF METHANOL WITH $CO_2$ TO PRODUCE ACETIC ACID

(71) Applicant: COUNCIL OF SCIENTIFIC AND INDUSTRIAL RESEARCH AN INDIAN REGISTERED BODY INCORPORATED UNDER THE REGN. OF SOC. ACT, New Delhi (IN)

(72) Inventors: Suman Lata Jain, Dehradun (IN); Sandhya Saini, Dehradun (IN); Praveen Kumar Khatri, Dehradun (IN); Indrajit Kumar Ghosh, Dehradun (IN); Anjan Ray, Dehradun (IN)

(73) Assignee: Council of Scientific and Industrial Research, New Delhi (IN)

( * ) Notice: Subject to any disclaimer, the term of this patent is extended or adjusted under 35 U.S.C. 154(b) by 783 days.

(21) Appl. No.: 17/905,526

(22) PCT Filed: Mar. 10, 2021

(86) PCT No.: PCT/IN2021/050231
§ 371 (c)(1),
(2) Date: Sep. 2, 2022

(87) PCT Pub. No.: WO2021/186459
PCT Pub. Date: Sep. 23, 2021

(65) Prior Publication Data
US 2023/0122417 A1   Apr. 20, 2023

(30) Foreign Application Priority Data
Mar. 16, 2020 (IN) .............................. 202011011197

(51) Int. Cl.
*C07C 51/15* (2006.01)
*B01J 31/16* (2006.01)
*B01J 35/39* (2024.01)

(52) U.S. Cl.
CPC ............ *C07C 51/15* (2013.01); *B01J 31/1616* (2013.01); *B01J 35/39* (2024.01)

(58) Field of Classification Search
CPC ................................ B01J 35/39; C07C 51/00
See application file for complete search history.

(56) References Cited

U.S. PATENT DOCUMENTS 3,769,329 A   10/1973   Paulik et al.

FOREIGN PATENT DOCUMENTS

| | | |
|---|---|---|
| CN | 1672791 A | 9/2005 |
| CN | 105001048 A | 10/2015 |
| CN | 107008502 A | 8/2017 |
| CN | 107008502 B | 5/2019 |
| EP | 2812305 A1 | 12/2014 |
| KR | 1997-0025711 A | 6/1997 |
| WO | 2013/119275 A1 | 8/2013 |
| WO | 2016/108389 A1 | 7/2016 |

OTHER PUBLICATIONS

Sushant Sahu, Yamin Liu, Ping Wang, Christopher E. Bunker, K. A. Shiral Fernando, William K. Lewis, Elena A. Guliants, Fan Yang, Jinping Wang, and Ya-Ping Sun. Langmuir 2014 30 (28), 8631-8636 (Year: 2014).*
Zhihuan Zhao, Jimin Fan, Mingming Xie, Zhizhong Wang, "Photocatalytic reduction of carbon dioxide with in-situ synthesized CoPc/TiO2 under visible light irradiation." Journal of Cleaner Production, 2009, 17, 11, 1025-1029 (Year: 2009).*
https://www.indiamart.com/proddetail/led-bulbs-5w-6w-7w-9w-12-w-15-30-w-45-w-50-w-25870336333.html?srsltid=AfmBOoq2SDxNTov5o0MjFRP2ULuE-nt27dvF0rQsPGNWA4rzVDf4dhTi (Year: 2003).*
Office Action for Chinese Patent Application No. 202180006792.1 (Jan. 17, 2024).
International Search Report and Written Opinion of PCT/IN2021/050231. (Jun. 22, 2021).
Qian et al., "Synthesis of acetic acid via methanol hydrocarboxylation with CO2 and H2", Nature Communications, 7:11481: 1-7 (2016).
Cui et al., "Efficient synthesis of acetic acid via Rh catalyzed methanol hydrocarboxylation with CO2 and H2 under milder conditions", Green Chemistry 19: 3558-3565 (2017).

* cited by examiner

Primary Examiner — Brian W Cohen
Assistant Examiner — Nathanael Jason Downes
(74) Attorney, Agent, or Firm — Merchant & Gould P.C.; Daniel R. Evans

(57) ABSTRACT

The present invention discloses a photocatalytic process and methodology for the preparation of acetic acid by a hydrocarboxylation reaction of methanol using carbon dioxide under visible light irradiation. Importantly, the reaction occurred under ambient temperature and pressure condition using a readily available household LED lamp in the presence of a transition metal based molecular photocatalyst, homogeneous as well as supported to semiconductor support and a $CO_2$-philic solvent without adding any external electron and proton donors.

11 Claims, No Drawings

PROCESS FOR PHOTOCATALYTIC HYDROCARBOXYLATION OF METHANOL WITH $CO_2$ TO PRODUCE ACETIC ACID

This application is a National Stage Application of PCT/IN2021/050231, filed Mar. 10, 2021, which claims benefit of priority to Indian patent application Ser. No. 202011011197, filed Mar. 16, 2020, and which applications are incorporated herein by reference. To the extent appropriate, a claim of priority is made to each of the above disclosed applications.

FIELD OF THE INVENTION

The present invention discloses a photocatalytic process and methodology for the preparation of acetic acid by a hydrocarboxylation reaction of methanol using carbon dioxide under visible light irradiation. Importantly, the reaction occurred under ambient temperature and pressure condition using a readily available household LED lamp in the presence of a transition metal based molecular photocatalyst, homogeneous as well as supported to semiconductor support and a $CO_2$-philic solvent without adding any external electron and proton donors.

BACKGROUND OF THE INVENTION

Acetic acid is an important basic chemical that is widely used in various areas, such as petrochemicals, polymers, synthetic organic chemistry, pharmaceuticals and agrochemicals. The conventional method for the synthesis of acetic acid involves the carbonylation of methanol with carbon monoxide.

There are three important processes known for the carbonylation of methanol; i) Monsanto process which was developed in 1960 involving a commercially available rhodium (Rh) complex; ii) Cativa process which was developed in 1990's involving the use of commercially available iridium (Ir) complex; iii) Acetica process by using a heterogeneous catalyst consisting of Rh complex immobilized on the polymer.

However, the above processes are highly energy intensive, entail tedious separation of the product and difficult isolation and disposal or reuse of the by-products. Specifically, Monsanto and Cativa processes involved the use of homogeneous catalysts, which are difficult to isolate and recycle. In addition, the use of precious and expensive metals such as rhodium and iridium compounded the disadvantages of the mentioned processes.

Synthesis of acetic acid from renewable, abundant and inexpensive carbon dioxide ($CO_2$) is of great importance, but known and reported routes encounter difficulties, especially in energy requirement, reaction selectivity, extent of $CO_2$ conversion and activity.

CN107008502B discloses a method for synthesizing acetic acid from ethanol, carbon dioxide and hydrogen gas in the presence of ruthenium complex and rhodium complex catalysts, an organic ligand, an iodide co-catalyst and a solvent. In this invention a homogeneous catalytic system was used to achieve the high yield and high-selectivity of acetic acid under a relatively mild condition. The method disclosed by the invention has important significance on recycling of the carbon dioxide and mitigation of environment problems caused by the carbon dioxide.

WO2016108389 discloses a catalyst for use in a reaction for preparing acetic acid by a carbonylation reaction of methanol using a carbon dioxide and, more specifically, to a heterogeneous catalyst represented by $Rh/C_3N_4$ in which a complex of a rhodium compound and 3-benzoylpyridine was immobilized on a support of carbon nitride.

KR19970025711 discloses a vapor phase method for the carbonylation of methanol with $CO_2$ using an oxidizing agent containing oxygen to oxidize the regenerate the catalyst. The oxidant includes air, oxygen, nitrogen dioxide, nitrogen monoxide, carbon dioxide, or peroxides and, the regenerated catalyst was used for the conversion of the reaction rate and selectivity to acetic acid is significantly improved.

The article Nature Communications, 7 (2016) 11481 reported the synthesis of acetic acid from $CO_2$, methanol and $H_2$ in the presence of Ru—Rh bimetallic catalyst using imidazole as the ligand and LiI as the promoter in 1,3-dimethyl-2-imidazolidinone (DMI) solvent. The reaction mechanism is proposed based on the control experiments. The mechanism suggested that the methanol was hydrocarboxylated into acetic acid by $CO_2$ and $H_2$, instead of carbonylation via conversion of $CO_2$ to CO. The strategy opens a new way for acetic acid production and $CO_2$ transformation, and represents a significant progress in synthetic chemistry.

The article Green Chem., 2017, 19, 3558-3565 reported the synthesis of acetic acid via methanol hydrocarboxylation with $CO_2$ and $H_2$ using rhodium based catalysts. Among the various reaction parameters studied, $Rh_2(CO)_4Cl_2$ with 4-methylimidazole (4-MI) as the ligand in the presence of LiCl and LiI were found to be efficient at 150° C. The TOF was as high as 26.2 $h^{-1}$ and the yield of acetic acid could reach 81.8% at 180° C. The catalytic system had obvious advantages, such as simplicity, high activity and selectivity, milder reaction conditions, and less corrosiveness.

The above hitherto known processes are associated with certain drawbacks such as expensive metal catalysts, hydrogen gas, high temperature and pressure. Thus, the drawbacks of the hitherto known processes as mentioned above evident the necessity for development of an improved process for the production of acetic acid from methanol and $CO_2$.

Objective of the Invention

The main objective of the present invention is to provide a photocatalytic process for the production of acetic acid via hydrocarboxylation of methanol with $CO_2$ under visible light irradiation, which obviates the drawbacks of hitherto known methods as detailed above. Further, the present invention is the first reported process for the hydrocarboxylation of methanol with $CO_2$ via a photocatalytic route.

Another objective of the present invention is to use a visible light source having wavelength (λ) greater than 420 nm or a broad spectrum of solar energy containing such wavelengths for the activation and conversion of the carbon dioxide under mild conditions.

Yet another objective of the present invention is to provide a process for the hydrocarboxylation of methanol with $CO_2$ using a low cost, non-precious transition metal catalyst such as nickel, cobalt or copper, more specifically cobalt and nickel.

Yet another objective of the present invention is to provide a process for the hydrocarboxylation of methanol with $CO_2$ using highly stable chelated nitrogen containing macrocyclic ligands based on moieties such as phthalocyanine, porphyrin, bipyridine.

Yet another objective of the present invention is to provide a reusable photocatalyst by immobilizing the molecular photosensitizer to photoactive support matrix, preferably heteroatom such as nitrogen containing carbons, octasulfur ($S_8$), transition metal oxides and mixed metal oxides.

Yet another objective of the present invention is to provide a process for the hydrocarboxylation of methanol with $CO_2$ using a $CO_2$-philic solvent such as, N, N-dimethylformamide, N, N-dimethylacetamide, dimethylsulfoxide, dimethylimidazoline, etc, particularly N-alkylamides.

Yet another objective of the present invention is to provide a process for the hydrocarboxylation of methanol with $CO_2$ without using any sacrificial electron donor.

Yet another objective of the present invention is to provide a process for the photocatalytic hydrocarboxylation of methanol and carbon dioxide where required hydrogen atoms are derived from methanol itself without any external hydrogen source.

Yet another objective of the present invention is to provide a process for the selective production of acetic acid from methanol and carbon dioxide at atmospheric pressure of $CO_2$ in typically ambient temperature ranges of 15-40° C., preferably at 25° C.

Yet another objective of the present invention is to provide a process for the photocatalytic hydrocarboxylation of methanol and carbon dioxide to produce acetic acid in 40-90% methanol conversion with >95% selectivity of the acetic acid.

Yet another objective of the present invention is to provide a plausible mechanism for the photocatalytic hydrocarboxylation of methanol and carbon dioxide to acetic acid under visible light irradiation.

SUMMARY OF THE INVENTION

In an aspect of the present disclosure, there is provided an improved hydrocarboxylation process for the synthesis of acetic acid comprising the steps of:
a. reacting methanol with $CO_2$ in the presence of a $CO_2$-philic solvent and a photocatalyst to obtain a reaction mixture and
b. irradiating the reaction mixture as obtained in step (a) under visible illumination to obtain the acetic acid.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

DETAILED DESCRIPTION OF THE INVENTION

The invention will now be described in detail in connection with certain preferred and optional embodiments, so that various aspects thereof may be more fully understood and appreciated.

Definitions

For convenience, before further description of the present disclosure, certain terms employed in the specification, and examples are delineated here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "hydrocarboxylation" herein refers to the process of addition of the $CO_2$ radical anion to methyl cation radical generated from methanol and atomic hydrogen ($H^+$) to give acetic acid under visible light illumination.

The term "electron and proton sacrificial donor" herein refers to methanol providing necessary electrons and hydrogen for the hydrocarboxylation reaction.

The term "$CO_2$-philic solvent" refers to a solvent that dissolves carbon dioxide. In the present disclosure, the term "$CO_2$-philic solvent" includes but not limited to N,N-dimethylformamide (DMF), N,N-dimethylacetamide (DMA), N-methyl pyrrolidone (NMP), dimethyl imidazoline (DMI), water, tetrahydrofuran (THF) and hexane.

The term "visible light" refers to the light having a wavelength $\lambda$ greater than 420 nm.

The term "visible illumination" herein refers to irradiating a reaction mixture with visible light. In the present disclosure, visible illumination is performed with LED light of 15-30 W having wavelength greater than 420 nm.

The term "photocatalyst" refers to a substance capable of absorbing light and providing the absorbed energy to reactants in a chemical reaction. In the present disclosure, the term "photocatalyst" includes but not limited to macrocyclic complex of transition metal such as ruthenium, cobalt, nickel, and copper, along with a ligand such as porphyrin, polypyridine and phthalocyanine.

The term "photoactive semiconductor support" refers to a support based on photoactive and semiconducting substance used herein for immobilizing a photocatalyst. In the present disclosure, the term "photoactive semiconductor support" includes but not limited to N-doped carbon, graphite carbon nitride, naturally occurring allotrope of sulfur (S8) and metal oxides of titanium, nickel, cobalt, iron, zinc and bismuth preferably NiO and $TiO_2$.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature in the range of 15° C. to 35° C. should be interpreted to include not only the explicitly recited limits of 18° C. to 29° C. but also to include sub-ranges, such as 17° C. to 22° C., and so forth, as well as individual amounts, within the specified ranges, such as 19.6° C., and 27.3° C.

The present disclosure is not to be limited in scope by the specific embodiments described herein, which are intended for the purposes of exemplification only. Functionally-equivalent products, compositions, and methods are clearly within the scope of the disclosure, as described herein.

The disclosure herein provides a method for producing acetic acid via photocatalytic hydrocarboxylation of methanol with $CO_2$ using a molecular photocatalyst and a $CO_2$-philic solvent to enhance the miscibility of $CO_2$ in the reaction mixture under visible light irradiation without using any external electron or proton sacrificial donor. The molecular photocatalyst is the macrocyclic complex of the low cost transition metal that can be used as homogeneous or after immobilization to a photoactive semiconducting support for facile recovery and recycling.

In an embodiment of the present disclosure, there is provided a hydrocarboxylation process for the synthesis of acetic acid comprising the steps of: a. reacting methanol with $CO_2$ in the presence of a $CO_2$-philic solvent and a photocatalyst to obtain a reaction mixture and b. irradiating the reaction mixture as obtained in step (a) under visible illumination to obtain the acetic acid.

In an embodiment of the present disclosure, there is provided a hydrocarboxylation process for the synthesis of acetic acid, wherein the $CO_2$-philic solvent is selected from the group consisting of N,N-dimethylformamide (DMF), N,N-dimethylacetamide (DMA), N-methyl pyrrolidone (NMP), dimethyl imidazoline (DMI), water, tetrahydrofuran (THF) and hexane. In another embodiment of the present disclosure, there is provided a hydrocarboxylation process for the synthesis of acetic acid, wherein the $CO_2$-philic solvent is N,N-dimethylacetamide (DMA).

In an embodiment of the present disclosure, there is provided a hydrocarboxylation process for the synthesis of acetic acid comprising the steps of: a. reacting methanol with $CO_2$ in the presence of a $CO_2$-philic solvent selected from the group consisting of N,N-dimethylformamide (DMF), N,N-dimethylacetamide (DMA), N-methylpyrrolidone (NMP), dimethyl imidazoline (DMI), water, tetrahydrofuran (THF) and hexane, and a photocatalyst to obtain a reaction mixture and b. irradiating the reaction mixture as obtained in step (a) under visible illumination to obtain the acetic acid.

In an embodiment of the present disclosure, there is provided a hydrocarboxylation process for the synthesis of acetic acid, wherein the photocatalyst is a macrocyclic chelated complex of transition metal selected from the group consisting of ruthenium, cobalt, nickel, copper and iron with a ligand selected from the group consisting of porphyrin, polypyridine and phthalocyanine. In another embodiment of the present disclosure, there is provided a hydrocarboxylation process for the synthesis of acetic acid, wherein the photocatalyst is a macrocyclic chelated complex of transition metal preferably selected from the group consisting of cobalt, nickel and copper with phthalocyanine.

In an embodiment of the present disclosure, there is provided a hydrocarboxylation process for the synthesis of acetic acid comprising the steps of: a. reacting methanol with $CO_2$ in the presence of a $CO_2$-philic solvent and a photocatalyst, wherein the photocatalyst is a macrocyclic chelated complex of transition metal selected from the group consisting of ruthenium, cobalt, nickel, copper and iron with a ligand selected from the group consisting of porphyrin, polypyridine and phthalocyanine, to obtain a reaction mixture and b. irradiating the reaction mixture as obtained in step (a) under visible illumination to obtain the acetic acid.

In an embodiment of the present disclosure, there is provided a hydrocarboxylation process for the synthesis of acetic acid comprising the steps of: a. reacting methanol with $CO_2$ in the presence of a $CO_2$-philic solvent selected from the group consisting of N,N-dimethylformamide (DMF), N,N-dimethylacetamide (DMA), N-methylpyrrolidone (NMP), dimethyl imidazoline (DMI), water, tetrahydrofuran (THF) and hexane, and a photocatalyst, wherein the photocatalyst is a macrocyclic chelated complex of transition metal selected from the group consisting of ruthenium, cobalt, nickel, copper and iron with a ligand selected from the group consisting of porphyrin, polypyridine and phthalocyanine, to obtain a reaction mixture and b. irradiating the reaction mixture as obtained in step (a) under visible illumination to obtain the acetic acid.

In an embodiment of the present disclosure, there is provided a hydrocarboxylation process for the synthesis of acetic acid, wherein the photocatalyst is immobilized on a photoactive semiconductor support.

In an embodiment of the present disclosure, there is provided a hydrocarboxylation process for the synthesis of acetic acid comprising the steps of: a. reacting methanol with $CO_2$ in the presence of a $CO_2$-philic solvent and a photocatalyst immobilized on a photoactive semiconductor support to obtain a reaction mixture and b. irradiating the reaction mixture as obtained in step (a) under visible illumination to obtain the acetic acid.

In an embodiment of the present disclosure, there is provided a hydrocarboxylation process for the synthesis of acetic acid, wherein the photoactive semiconductor support is selected from the group consisting of N-doped carbon, graphite carbon nitride, naturally occurring allotrope of sulfur (S8) and metal oxides of titanium, nickel, cobalt, iron, zinc and bismuth preferably NiO and $TiO_2$. In another embodiment of the present disclosure, there is provided a hydrocarboxylation process for the synthesis of acetic acid, wherein the photoactive semiconductor support is selected from naturally occurring allotrope of sulfur (S8). In yet another embodiment of the present disclosure, there is provided a hydrocarboxylation process for the synthesis of acetic acid, wherein the photocatalyst is immobilized on a photoactive semiconductor support and wherein the photoactive semiconducting support is selected from the group consisting of heteroatom doped carbon, naturally occurring allotrope of sulfur ($S_8$), transition metal oxides or mixed metal oxides.

In an embodiment of the present disclosure, there is provided a hydrocarboxylation process for the synthesis of acetic acid comprising the steps of: a. reacting methanol with $CO_2$ in the presence of a $CO_2$-philic solvent and a photocatalyst to obtain a reaction mixture and b. irradiating the reaction mixture as obtained in step (a) under visible illumination to obtain the acetic acid, and wherein the photocatalyst is immobilized on a photoactive semiconductor support selected from the group consisting of N-doped carbon, graphite carbon nitride, naturally occurring allotrope of sulfur (S8) and metal oxides of titanium, nickel, cobalt, iron, zinc and bismuth preferably NiO and $TiO_2$.

In an embodiment of the present disclosure, there is provided a hydrocarboxylation process for the synthesis of acetic acid, wherein the photocatalyst is reused.

In an embodiment of the present disclosure, there is provided a hydrocarboxylation process for the synthesis of acetic acid, wherein the methanol and $CO_2$-philic solvent is in a ratio of ranging from 5:1 to 1:1 and the ratio of methanol and $CO_2$ is 2:1.

In an embodiment of the present disclosure, there is provided a hydrocarboxylation process for the synthesis of acetic acid, wherein the weight ratio of the methanol and $CO_2$-philic solvent is in the range of 5:2 to 2:0.5. In another embodiment of the present disclosure, there is provided a hydrocarboxylation process for the synthesis of acetic acid, wherein the weight ratio of the methanol and $CO_2$-philic solvent is in the range of 2:1 to 1:1. In yet another embodiment of the present disclosure, there is provided a hydrocarboxylation process for the synthesis of acetic acid, wherein the weight ratio of the methanol and $CO_2$-philic solvent is 1:1.

In an embodiment of the present disclosure, there is provided a hydrocarboxylation process for the synthesis of acetic acid comprising the steps of: a. reacting methanol with $CO_2$ in the presence of a $CO_2$-philic solvent and a photocatalyst to obtain a reaction mixture and b. irradiating the reaction mixture as obtained in step (a) under visible illumination to obtain the acetic acid, wherein the methanol and $CO_2$-philic solvent is in a ratio of ranging from 5:1 to 1:1 and the ratio of methanol and $CO_2$ is 2:1.

In an embodiment of the present disclosure, there is provided a hydrocarboxylation process for the synthesis of acetic acid, wherein the reaction is carried out at a temperature ranging between 15-35° C. with a pressure ranging between 1-2 bar. In another embodiment of the present disclosure, there is provided a hydrocarboxylation process for the synthesis of acetic acid, wherein the reaction is carried out under ambient temperature and pressure conditions.

In an embodiment of the present disclosure, there is provided a hydrocarboxylation process for the synthesis of acetic acid comprising the steps of: a. reacting methanol with $CO_2$ in the presence of a $CO_2$-philic solvent and a photocatalyst at a temperature ranging between 15-35° C. with a pressure ranging between 1-2 bar to obtain a reaction mixture and b. irradiating the reaction mixture as obtained in step (a) under visible illumination to obtain the acetic acid.

In an embodiment of the present disclosure, there is provided a hydrocarboxylation process for the synthesis of acetic acid comprising the steps of: a. reacting methanol with $CO_2$ in the presence of a $CO_2$-philic solvent, wherein the methanol and $CO_2$-philic solvent is in a ratio of ranging from 5:1 to 1:1 and the ratio of methanol and $CO_2$ is 2:1, and a photocatalyst to obtain a reaction mixture and b. irradiating the reaction mixture as obtained in step (a) under visible illumination to obtain the acetic acid, wherein the reaction is carried out at a temperature ranging between 15-35° C. with a pressure ranging between 1-2 bar.

In an embodiment of the present disclosure, there is provided a hydrocarboxylation process for the synthesis of acetic acid, wherein the visible illumination is done with LED light of 15-30 W having wavelength in the range of 400 nm to 800 nm for a period ranging from 10 to 30 hours.

In an embodiment of the present disclosure, there is provided a hydrocarboxylation process for the synthesis of acetic acid, wherein the visible illumination is done with LED light of 18-26 W having wavelength greater than 420 nm for a period ranging from 15 to 27 hours. In another embodiment of the present disclosure, there is provided a hydrocarboxylation process for the synthesis of acetic acid, wherein the visible illumination is done with LED light of 20 W having wavelength greater than 420 nm for a period of 24 hours.

In an embodiment of the present disclosure, there is provided a hydrocarboxylation process for the synthesis of acetic acid comprising the steps of: a. reacting methanol with $CO_2$ in the presence of a $CO_2$-philic solvent and a photocatalyst to obtain a reaction mixture and b. irradiating the reaction mixture as obtained in step (a) under visible illumination, wherein the visible illumination is done with LED light of 15-30 W having wavelength greater than 420 nm for a period ranging from 10 to 30 hours, to obtain the acetic acid.

In an embodiment of the present disclosure, there is provided a hydrocarboxylation process for the synthesis of acetic acid, wherein the yield of acetic acid is in the range of 30-80% and selectivity of in the range of 95 to 99%. In an embodiment of the present disclosure, there is provided a hydrocarboxylation process for the synthesis of acetic acid, wherein the yield of acetic acid is in the range of 35-70% and selectivity of more than 96%.

In an embodiment of the present disclosure, there is provided a hydrocarboxylation process for the synthesis of acetic acid comprising the steps of: a. reacting methanol with $CO_2$ in the presence of a $CO_2$-philic solvent and a photocatalyst to obtain a reaction mixture and b. irradiating the reaction mixture as obtained in step (a) under visible illumination to obtain the acetic acid, wherein the yield of acetic acid is in the range of 30-80% and selectivity of more than 96%.

In an embodiment of the present disclosure, there is provided a hydrocarboxylation process for the synthesis of acetic acid comprising the steps of: a. reacting methanol with $CO_2$ in the presence of a $CO_2$-philic solvent, wherein the methanol and $CO_2$-philic solvent is in a ratio of ranging from 5:1 to 1:1 and the ratio of methanol and $CO_2$ is 2:1, and a photocatalyst to obtain a reaction mixture and b. irradiating the reaction mixture as obtained in step (a) under visible illumination, wherein the visible illumination is done with LED light of 15-30 W having wavelength greater than 420 nm for a period ranging from 10 to 30 hours, to obtain the acetic acid, and wherein the reaction is carried out at a temperature ranging between 15-35° C. with a pressure ranging between 1-2 bar, and the yield of acetic acid is in the range of 30-80% and selectivity of more than 96%.

In an embodiment of the present disclosure, there is provided an improved process for the production of acetic acid from methanol and $CO_2$ in the presence of catalytic amount of macrocyclic complex of transition metals such as cobalt, nickel or copper both in homogeneous or supported to photoactive semiconducting supports in the presence of a $CO_2$-philic solvent without using external sacrificial electron or proton donor in the temperature range 20-40° C. for a period 24 h in a batch photoreactor using a house hold visible light to obtain desired acetic acid in the range 20-80% with 85-99% selectivity. After the consumption of $CO_2$, the solvent could be recovered from the reaction mixture under reduced pressure.

In an embodiment of the present disclosure, there is provided a hydrocarboxylation process for the synthesis of acetic acid, wherein the same process can be used for the production of other carboxylic acids from the hydrocarboxylation of other alcohols such as ethanol, propanol, and the like.

In an embodiment of the present disclosure, there is provided a hydrocarboxylation process for the synthesis of acetic acid, wherein the amount of photocatalyst used is in the range of 0.1 to 10 mol %. In another embodiment of the present disclosure, there is provided a hydrocarboxylation process for the synthesis of acetic acid, wherein the amount of photocatalyst used is preferably in the range of 1 to 10 mol %. In another embodiment of the present disclosure, there is provided a hydrocarboxylation process for the synthesis of acetic acid, wherein the amount of photocatalyst used is preferably in the range of 2 to 5 mol %.

In an embodiment of the present disclosure, there is provided a hydrocarboxylation process for the synthesis of acetic acid, wherein the visible light source used is preferably house hold LED light of 10 to 30 W.

In an embodiment of the present disclosure, there is provided a hydrocarboxylation process for the synthesis of acetic acid, wherein the conversion of the methanol to acetic acid is analyzed by GC-TCD on the basis of unreacted methanol in the reaction.

In an embodiment of the present disclosure, there is provided a hydrocarboxylation process for the synthesis of acetic acid, wherein the solvent used to increase the solubility of $CO_2$ in the reaction mixture is recovered after the photocatalytic reaction.

In an embodiment of the present disclosure, there is provided a hydrocarboxylation process for the synthesis of acetic acid, wherein the conversion of the methanol to acetic acid remained 20 to 70% with respect to the methanol used.

In an embodiment of the present disclosure, there is provided a hydrocarboxylation process for the synthesis of acetic acid, wherein the selectivity of the acetic acid remained >80% without observing any side product in liquid phase. However, minute quantity (<3%) of hydrocarbon such as ethane and propane were observed in the gaseous phases, as determined by GC-FID and RGA analytical techniques.

In an embodiment of the present disclosure, there is provided a hydrocarboxylation process for the synthesis of acetic acid, wherein the hydrocarboxylation of methanol with $CO_2$ occurs without adding any external sacrificial electron and proton donors.

In an embodiment of the present disclosure, there is provided a hydrocarboxylation process for the synthesis of acetic acid, wherein the possible mechanism suggested the formation of methyl radical cation and $CO_2$ anion radical from the oxidation of methanol and $CO_2$, respectively under the photocatalytic conditions. The coupling of radicals followed by abstraction of hydrogen from another molecule of methanol afforded acetic acid.

EXAMPLES

Following are the examples given to further illustrate the invention and should not be construed to limit the scope of the present invention.

According to the present invention, methanol and N,N-dimethylacetamide (DMA) in (2:1 to 1:1 wt %) was taken in to a 60 ml vessel. Further, transition metal based photocatalyst (1 to 10 mol %) was added and the resulting mixture was saturated with $CO_2$ by purging. The reaction vessel was sealed and irradiated with LED, 20 W light (Model No. HP-FL-20 W-F, Hope LED Opto-Electric CO., Ltd) for 24 h. The intensity of the LED light at the reaction flask was measured to be 86 W/m$^2$ by intensity meter. The conversion and selectivity of acetic acid were examined by GC-TCD based on the unreacted methanol. Furthermore, the unreacted methanol and solvent were recovered by distillation under reduced pressure and the resulting mixture was analyzed by HPLC for confirmation of the acetic acid product. The conversion of methanol remained 40-80% and the selectivity of the acetic acid remained >95% along with the minute quantity (<3%) of the hydrocarbon (ethylene, ethane, propane) in gaseous phase as confirmed RGA.

Example 1

Preparation of Metal Phthalocyanine Complex

Phthalic anhydride (4 g, 19.6 mmol), metal salt (5.45 mmol), urea (48 g, 0.8 mmol), ammonium chloride (4.048 g, 75.7 mmol) and ammonium molybdate (0.44 g, 2.23 mmol) were pulverized in a mortar, placed in a quartz vessel of 50 ml, and irradiated in a microwave oven at 440 W for 15 minutes. Thereafter, the reaction product was rinsed with deionized water, filtered under suction and dried under vacuum at 120° C. The crude product was added to 2% HCl and the resulting mixture was heated to boil for 30 minutes. After filtering and drying the product, it was added to a 1% aqueous NaOH solution, boiled for 30 minutes, filtered, and dried. The acid/base washing was repeated three times. Finally, the obtained bluish solid was dried in oven to get metal phthalocyanine with a yield of 81-85%. The oven-dried product was used as such for the photocatalytic hydrocarboxylation of methanol with $CO_2$ to produce acetic acid. Similarly, phthalocyanine complexes of other transition metals such as copper, nickel, iron were synthesized and used for the said hydrocarboxylation reaction.

IR(KBr); 2962, 2896, 2855, 1616, 1528, 1484, 1365, 1338, 1256, 1195, 1145, 1082, 1056, 923, 828, 745, 688, 553 cm-1. MS: m/z 800(M+). UV-Vis (n-hexane) λ max: B band (328 nm); Q band (567 nm, 674 nm).

Example 2

Preparation of Metal Porphyrin Complex

In a typical synthesis, metal free base porphyrin (1.0 g) was treated with metal salt (3.0 g) in DMF (100 mL) at 60° C. for 5-6 h. After completion of the reaction, the mixture was diluted with water and extracted with dichloromethane (150 mL). The organic layer was dried with anhydrous sodium sulfate and concentrated under reduced pressure. The crude product was purified by chromatography on silica gel using $CH_2Cl_2$ and methanol (10:1). Finally the product was dried under vacuum to get the yield 85-92%.

Similarly polypyridyl complexes of transition metals such as ruthenium, cobalt and nickel were synthesized by treating the metal salt with bipyridine in acetonitrile under reflux for 5-6 h followed by usual workup to get the yield of the final metal complex in 80-85% yield.

Example 3

Immobilization of Metal Complex to Photoactive Semiconductor Support

In a general synthetic procedure, 100 mg of metal complex (as synthesized in Example 1) was dispersed in 10 mL ethanol with vigorous stirring for 2 h at room temperature in a beaker. In another beaker, 1 g of photoactive semiconductor support (N-doped carbon, graphitic carbon nitride, naturally occurring allotrope of sulfur ($S_8$), transition metal oxide, mixed metal oxide) was added to 10 mL of deionised water with sonication for two hours. Afterwards, both the solution mixed and kept with stirring overnight or until the complete evaporation of the solvent. The residue so obtained was thoroughly washed with ethanol and dried under reduced pressure at 60° C. The metal content in the composite was determined by ICP-AES.

Example 4

4.1 Preparation of Acetic Acid by the Reaction of Methanol Hydrocarboxylation with $CO_2$ The photocatalytic hydrocarboxylation reaction was carried out in a 60 ml borosil vessel containing methanol (3 mL), DMA (3.5 mL) and a photocatalyst (2 mol %). The reaction mixture was saturated by purging with $CO_2$ for 30 min. The reaction vessel was sealed and irradiated with LED, 20 W light (Model No. HP-FL-20 W-F, Hope LED Opto-Electric CO., Ltd) for 24 h. The intensity of the LED light at the reaction flask was measured to be 86 W/m². After completion of the reaction, the photocatalyst was removed either by a syringe filter or by filtration for reuse and the resulting residue subjected for analysis to determine the conversion and selectivity of acetic acid by GC-TCD based on the unreacted methanol. Furthermore, after the reaction the unreacted methanol and solvent could be recovered by distillation under reduced pressure and the residue was analyzed by HPLC for confirmation of the acetic acid. The conversion of methanol remained 20-80% and the selectivity of the acetic acid remained >95-98% along with the minute quantity (2-3%) of hydrocarbon products in the gaseous phase as confirmed by RGA.

4.2 Preparation of Acetic Acid by the Reaction of Methanol Hydrocarboxylation with $CO_2$ Using Different Photocatalysts The photocatalytic hydrocarboxylation reaction was carried out in a 60 ml borosil vessel containing methanol (3 mL), DMA (3.5 mL) and a photocatalyst as mentioned in example 1 (5 mol %). The reaction mixture was saturated by purging with $CO_2$ for 30 min. The reaction vessel was sealed and irradiated with LED, 20 W light (Model No. HP-FL-20 W-F, Hope LED Opto-Electric CO., Ltd) for 24 h. The intensity of the LED light at the reaction flask was measured to be 86 W/m². After completion of the reaction, the reaction mixture subjected to usual work-up and analysis as mentioned in the previous example. The conversion of methanol and the selectivity of the acetic acid obtained with different photocatalysts as mentioned above in Example 3.1 under identical experimental conditions are summarized in Table 1 (Example 1-17). Among all the photocatalysts studied CoPc/$S_8$ showed maximum conversion of methanol and selectivity of acetic acid.

4.3 Preparation of Acetic Acid by the Reaction of Methanol Hydrocarboxylation with $CO_2$ (Different Solvent)

The photocatalytic hydrocarboxylation reaction was carried out in a 60 ml borosil vessel containing methanol (3 mL), solvent (3.5 mL) and a photocatalyst (5 mol %). The solvents tested are: water, N,N-dimethylformamide (DMF), N,N-dimethylacetamide (DMA), N-methyl pyrrolidone (NMP), dimethyl imidazoline (DMI), tetrahydrofuran (THF) and hexane. The reaction mixture was saturated by purging with $CO_2$ for 30 min. The reaction vessel was sealed and irradiated with LED, 20 W light (Model No. HP-FL-20 W-F, Hope LED Opto-Electric CO., Ltd) for 24 h. The intensity of the LED light at the reaction flask was measured to be 86 W/m². After completion of the reaction, the photocatalyst removed by syringe filter and the resulting filtrate was analyzed to determine the conversion and selectivity of acetic acid by GC-TCD based on the unreacted methanol. The results of these experiments are summarized in Table 1 (example 19-25).

4.4 Preparation of Acetic Acid by the Reaction of Methanol Hydrocarboxylation with $CO_2$ (Different Amount of Photocatalyst)

The photocatalytic hydrocarboxylation reaction was carried out in a 60 ml borosil vessel containing methanol (3 mL), DMA (3.5 mL) and a photocatalyst (1-10 mol %). The reaction mixture was saturated by purging with $CO_2$ for 30 min. The reaction vessel was sealed and irradiated with LED, 20 W light (Model No. HP-FL-20 W-F, Hope LED Opto-Electric CO., Ltd) for 24 h. The intensity of the LED light at the reaction flask was measured to be 86 W/m². After completion of the reaction, the photocatalyst removed by syringe filter and the resulting filtrate was analyzed to determine the conversion and selectivity of acetic acid by GC-TCD based on the unreacted methanol. The results of these experiments are summarized in Table 1 (example 26-31). Among the various amounts tested, 2-5 mol % of the photocatalyst was found to be optimum and afforded maximum conversion of methanol with the selective production of acetic acid.

TABLE 1

Photocatalytic hydrocarboxylation of methanol with $CO_2$

| Example | Photocatalyst | Solvent | Visible | Conv. | Select. |
|---|---|---|---|---|---|
| 1 | Ru(bpy)$_3$ | DMA | Yes | — | — |
| 2 | Ru(bpy)$_3$/Ni—NiO | DMA | Yes | 62 | 30 |
| 3 | Ru(bpy)$_3$Cl$_2$/NiPc | DMA | Yes | 15 | 62 |
| 4 | Ru(bpy)$_3$Cl$_2$/NiBr$_2$ | DMA | Yes | 9 | — |
| 5 | [Ni(bpy)$_3$]Cl$_2$ | DMA | Yes | 13 | 97 |
| 6 | NiPc | DMA | Yes | 47 | 97 |
| 7 | CoPc | DMA | Yes | 40 | — |
| 8 | CoPc/S$_8$ | DMA | Yes | 64$^a$ 64$^b$, 62$^b$, | 98 98, 98, 97 |
| 9 | CoPc/GO | DMA | Yes | 40 | 87 |
| 10 | CoPc/g-C$_3$N$_4$ | DMA | Yes | 50 | 90 |
| 11 | NiPc/S$_8$ | DMA | Yes | 58 | 97 |
| 12 | NiPc/GO | DMA | Yes | 42 | 92 |
| 13 | CuPc/S$_8$ | DMA | Yes | 28 | 80 |
| 14 | Co(II) porphyrin/S$_8$ | DMA | Yes | 30 | 90 |
| 15 | Ni(bpy)$_2$/S$_8$ | DMA | Yes | 60 | 97 |
| 16 | Ni(bpy)$_2$/GO | DMA | Yes | 44 | 95 |
| 17 | Ni(bpy)$_2$/g-C$_3$N$_4$ | DMA | Yes | 38 | 92 |
| 18 | — | DMA | Yes | — | — |
| 19 | NiPc | H$_2$O | Yes | — | — |
| 20 | NiPc | DMF | Yes | 37 | 82 |
| 21 | NiPc | NMP | Yes | — | — |
| 22 | NiPc | DMI | Yes | 5 | 60 |
| 23 | NiPc | THF | Yes | — | — |

TABLE 1-continued

Photocatalytic hydrocarboxylation of methanol with $CO_2$

| Example | Photocatalyst | Solvent | Visible | Conv. | Select. |
|---|---|---|---|---|---|
| 24 | NiPc | Hexane | Yes | — | — |
| 25 | NiPc | — | Yes | 20 | — |
| 26 | NiPc (1 mol %) | DMA | Yes | 42 | 97 |
| 27 | NiPc (2 mol %) | DMA | Yes | 47 | 97 |
| 28 | NiPc (5 mol %) | DMA | Yes | 50 | 97 |
| 29 | NiPc (7.5 mol %) | DMA | Yes | 44 | 97 |
| 30 | NiPc (10 mol %) | DMA | Yes | 45 | 97 |
| 31 | NiPc (2 mol %) | DMA | No | — | — |

[a]using fresh photocatalyst;
[b]using recovered photocatalyst

As is found from the above Table 1, Example 1 to 17 showed the comparison of the different homogeneous and supported photocatalysts on the conversion of methanol and selectivity of the acetic acid under the described photocatalytic hydrocarboxylation conditions. Among the various photocatalysts tested cobalt phthalocyanine supported on octasulfur afforded maximum conversion 64% with the 98% selectivity of acetic acid in the presence of DMA as a solvent under visible illumination for 24 h with the added benefits of facile recovery of the photocatalyst by filtration and reusability for subsequent three runs. Example 18 showed that in the absence of photocatalyst the hydrocarboxylation of methanol with $CO_2$ under described conditions did not occur.

Example 19-25 in Table 1 showed the comparison of different solvents on the conversion of methanol and selectivity of the acetic acid under the described photocatalytic hydrocarboxylation conditions. Among the various solvents studied, DMA provided maximum conversion of methanol (47%) with the selective production of acetic acid using NiPc as catalyst. As showed in Example 25, there was poor conversion of methanol to acetic acid observed in the absence of a $CO_2$-philic solvent.

Example 26-31 in Table 1 showed the effect of the photocatalyst amount on the conversion of methanol and selectivity of the acetic acid under the described photocatalytic hydrocarboxylation conditions. Among the various amounts used, 2-5 mol % of photocatalyst is optimum for maximum conversion of methanol with selective production of acetic acid. Example 31 clearly indicated the photocatalytic nature of the reaction as there was no conversion occurred in the absence of visible light under otherwise optimum conditions.

Advantages of the Present Invention

The present invention describes for the first-time photocatalytic production of acetic acid from hydrocarboxylation of methanol with $CO_2$ under ambient temperature and pressure conditions.

The present invention uses carbon dioxide as a carboxylating agent that is abundantly available, safe and inexpensive as compared to the carbon monoxide that is used in the industrial production of acetic acid.

The present invention provides the activation of $CO_2$ using renewable energy under ambient conditions.

The present invention provides a cost-effective transition metal catalyst for the hydrocarboxylation of methanol with $CO_2$ to produce acetic acid.

The present invention provides a very simple protocol for the production of acetic acid using $CO_2$ as a feedstock.

The disclosed invention represents a very facile, cost effective and novel approach for the hydrocarboxylation of methanol using $CO_2$. Therefore it has a huge potential to develop a commercial process for producing acetic acid from methanol and $CO_2$ under mild conditions.

We claim:
1. A hydrocarboxylation process for the synthesis of acetic acid comprising the steps of:
   a. combining methanol with $CO_2$ in the presence of a $CO_2$-philic solvent and a photocatalyst to obtain a reaction mixture; and
   b. irradiating the reaction mixture as obtained in step (a) under visible illumination to obtain the acetic acid;
   wherein the methanol and $CO_2$-philic solvent is in a weight ratio of ranging from 5:1 to 1:1 and the methanol and $CO_2$ is in a weight ratio is 2:1.

2. The process as claimed in claim 1, wherein the $CO_2$-philic solvent is selected from the group consisting of N,N-dimethylformamide, N,N-dimethylacetamide, N-methylpyrrolidone, dimethyl imidazoline, water, tetrahydrofuran, hexane, and a combination thereof.

3. The process as claimed in claim 1, wherein the photocatalyst is a macrocyclic complex of transition metal selected from the group consisting of ruthenium, cobalt, nickel, and copper with a ligand selected from the group consisting of porphyrin, polypyridine, and phthalocyanine.

4. The process as claimed in claim 1, wherein the photocatalyst is immobilized on a photoactive semiconductor support.

5. The process as claimed in claim 4, wherein the photoactive semiconductor support is selected from the group consisting of N-doped carbon, graphite carbon nitride, naturally occurring allotrope of sulfur (S8), and metal oxides of titanium, nickel, cobalt, iron, zinc and bismuth.

6. The process as claimed in claim 1, wherein the photocatalyst is reused.

7. The process as claimed in claim 1, wherein the methanol and $CO_2$-philic solvent weight ratio ranges from 5:2 to 2:0.5.

8. The process as claimed in claim 1, wherein the reaction is carried out at a temperature ranging between 15-35° C. with a pressure ranging between 1-2 bar.

9. The process as claimed in claim 1, wherein the visible illumination is done with LED light of 15-30W having wavelength in the range of 400nm to 800 nm for a period ranging from 10 to 30 hours.

10. The process as claimed in claim 1 wherein the yield of acetic acid is in the range of 30-80% and selectivity in the range of 95 to 99%.

11. The process as claimed in claim 4, wherein the photoactive semiconductor support is selected from the group consisting of NiO and $TiO_2$.

* * * * *